United States Patent [19]

Marshall et al.

[11] Patent Number: 5,151,476
[45] Date of Patent: Sep. 29, 1992

[54] MICRO-SUSPENSION POLYMERIZATION OF VINYL CHLORIDE WITH ASCORBIC ACID AND WATER-SOLUBLE METAL SALTS

[75] Inventors: Richard A. Marshall, Akron; James W. Hershberger; Susan A. Hershberger, both of Oxford, all of Ohio

[73] Assignee: The Goodyear Tire & Rubber Company, Akron, Ohio

[21] Appl. No.: 551,364

[22] Filed: Jul. 12, 1990

Related U.S. Application Data

[62] Division of Ser. No. 90,998, Aug. 31, 1987, abandoned.

[51] Int. Cl.⁵ .............................................. C08F 2/16
[52] U.S. Cl. ................................... 526/93; 526/344.2
[58] Field of Search ..................... 526/91, 93, 344.1

[56] References Cited

U.S. PATENT DOCUMENTS

| | | |
|---|---|---|
| 3,879,364 | 4/1975 | Kemp et al. |
| 4,091,197 | 5/1978 | Fischer et al. ........................ 526/91 |
| 4,543,401 | 9/1985 | Gaylord ............................. 526/204 |
| 4,833,180 | 5/1989 | Brulet ................................. 523/322 |

FOREIGN PATENT DOCUMENTS 2057470 4/1981 United Kingdom .
2065681 7/1981 United Kingdom .

*Primary Examiner*—Christopher Henderson
*Attorney, Agent, or Firm*—Alvin T. Rockhill

[57] ABSTRACT

Micro-suspension polymerization is a technique that it is widely used on a commercial basis for the polymerization of vinyl chloride monomer into polyvinyl chloride. This invention reveals a greatly improved redox initiator system for use in such polymerizations. The redox initiator systems of this invention are comprised of (a) a free radical generator, such as a peroxide, and (b) a reducing agent selected from the group consisting of ascorbic acid, isoascorbic acid, and certain derivatives of ascorbic acid. The initiator systems of this invention do not require the utilization of water-soluble metal salts. However, water-soluble metal salts can be utilized in such initiator systems in catalytic amounts wherein the ratio of the water-soluble metal salt to the free radical generator is less than 0.09.

14 Claims, No Drawings

MICRO-SUSPENSION POLYMERIZATION OF VINYL CHLORIDE WITH ASCORBIC ACID AND WATER-SOLUBLE METAL SALTS

This is a divisional of application Ser. No. 07/090,998, filed on Aug. 31, 1987, now abandoned.

BACKGROUND OF THE INVENTION

Polyvinyl chloride (PVC) is widely used in a variety of applications. PVC is utilized in making rigid articles such as pipe, house siding, phonograph records, automotive parts, and household appliances. PVC is also utilized in manufacturing flexible items, such as packaging films, gaskets, furniture upholstery, wall coverings, garden hoses, shower curtains, car tops, floor mats, and detergent bottles. PVC can be made by utilizing suspension polymerization, mass polymerization, emulsion polymerization, or solution polymerization. Suspension polymerization is the most widely used technique for preparing PVC. In suspension polymerizations monomer droplets are suspended in an aqueous polymerization medium by a combination of vigorous agitation and protective colloids. Such polymerizations are generally initiated by free radicals which are produced by the thermal decomposition of peroxides.

U.S. Pat. No. 3,879,364 discloses the utilization of a seeding product in the polymerization of vinyl chloride monomer into polyvinyl chloride. The seeding product contains all of the initiator which is required for the main polymerization. U.S. Pat. No. 4,091,197 suggests activating the initiator with a metal complex which is formed by the reaction between a water-soluble metal salt and a complexing agent. U.S. Pat. No. 4,091,197 states that these complexes are utilized in proportions such that the molar ratio of metallic complex to initiator is between 0.1 and 10.

SUMMARY OF THE INVENTION

This invention is based upon the discovery that ascorbic acid, isoascorbic acid and certain derivatives of ascorbic acid can be utilized to activate free radical generators without the need for any water-soluble metal salts. In fact, it has been determined that numerous benefits can be realized by conducting such polymerizations in the presence of little or no metal salt complexes.

This invention more specifically reveals a process for the micro-suspension polymerization of vinyl chloride monomer into polyvinyl chloride in the presence of water and an emulsifier; the improvement which comprises utilizing as the initiator a redox system which is comprised of (a) a free radical generator and (b) a reducing agent selected from the group consisting of ascorbic acid, isoascorbic acid, and ascorbic acid derivatives having the structural formula:

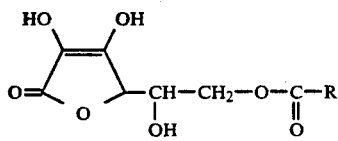

wherein R is an alkyl group containing form 1 to 30 carbon atoms, and wherein said polymerization is conducted at pH which is within the range of about 8.5 to about 11, with the proviso that said polymerization is conducted in the absence of any water-soluble metal salts of iron, copper, cobalt, nickel, zinc, tin, titanium, vanadium, manganese, chromium or silver.

The present invention also discloses a process for the micro-suspension polymerization of vinyl chloride monomer into polyvinyl chloride in the presence of water and an emulsifier; the improvement which comprises utilizing as the initiator a redox system which is comprised of (a) a free radical generator, (b) a reducing agent selected from the group consisting of ascorbic acid, isoascorbic acid, and ascorbic acid derivatives having the structural formula:

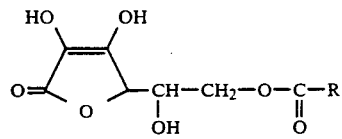

wherein R is an alkyl group containing from 1 to 30 carbon atoms, and (c) a water-soluble metal salt of iron, copper, cobalt, nickel, tin, titanium, vanadium, manganese, chromium or silver; wherein the molar ratio of said water-soluble metal salt to said free radical generator is less than 0.09.

This invention further discloses a process for preparing polyvinyl chloride in micro-suspension polymerization which comprises polymerizing vinyl chloride monomer in micro-suspension in the presence of a seeding product in the form of a dispersion of particles of polyvinyl chloride prepared beforehand in micro-suspension wherein said seeding product contains all of the free radical generator necessary for polymerization and wherein said free radical generator is activated with a reducing agent selected from the group consisting of ascorbic acid, isoascorbic acid, and ascorbic acid derivatives having the structural formula:

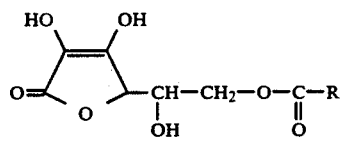

wherein R is an alkyl group containing from 1 to 30 carbon atoms, and wherein said polymerization is conducted at a pH which is within the range of about 8.5 to about 11, with the proviso that said polymerization is conducted in the absence of any water-soluble metal salts of iron, copper, cobalt, nickel, zinc, tin, titanium, vanadium, manganese, chromium or silver.

DETAILED DESCRIPTION OF THE INVENTION

The term polyvinyl chloride (PVC) as used herein is meant to include homopolymers which are comprised of repeat units which are derived from vinyl chloride monomer as well as copolymers containing at least 50% by weight repeat units which are derived from vinyl chloride monomer and at east one additional monomer which is copolymerizable with the vinyl chloride. In many cases such copolymers will contain at least 90% by weight repeat units which are derived from vinyl chloride. Such copolymerizable monomers are those generally employed in conventional methods of copolymerizing vinyl chloride. Some examples are vinyl esters of mono- and polycarboxylic acids, such as vinyl acetate, propionate and benzoate; unsaturated mono- and polycarboxylic acids such as acrylic, methacrylic, maleic, fumaric and itaconic acid as well as their aliphatic, cycloaliphatic and aromatic esters, their amides and their nitriles; vinyl and vinylidene halides: alkyl vinyl ethers and olefins. PVC is prepared in accordance with this invention utilizing a micro-suspension polymerization technique. Such polymerizations are conducted in an aqueous medium which contains water, vinyl chloride monomer, at least one emulsifier, and the redox system of this invention. The redox systems of this invention are comprised of a free radical generator and a reducing agent selected from the group consisting of ascorbic acid, isoascorbic acid, and ascorbic acid derivatives having the structural formula:

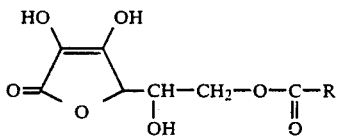

wherein R is an alkyl group containing from 1 to 30 carbon atoms. Such redox systems can be utilized in the absence of any water-soluble metal salts of iron, copper, cobalt, nickel, zinc, tin, titanium, vanadium, manganese, chromium or silver. However, in cases where such redox systems are utilized in the absence of water-soluble metal salts, it is critical to maintain a pH throughout the polymerization which is within the range of about 8.5 to about 11. In such cases, it is preferable to maintain a pH which is within the range of 9 to 10.5 . It is most preferred to maintain a pH which is within the range of 9.5 to 10.

The redox initiator systems of the present invention can also be utilized in conjunction with catalytic amounts of water-soluble metal salts of iron, copper, cobalt, nickel, tin, titanium, vanadium, manganese, chromium or silver. In such cases, the molar ratio of the water-soluble metal salt to the free radical generator is less than 0.09. In most cases, the molar ratio of the water-soluble metal salt to the free radical generator will be within the range of 0.00001 to 0.08. It is normally preferred for the ratio of the water-soluble metal salt to the free radical generator to be within the range of 0.0001 to 0.01 with a ratio of 0.001 to 0.008 being most preferred. It is not as critical to control the pH in polymerizations which are conducted in the presence of a catalytic amount of a water-soluble metal salt. For this reason, it is advantageous in many cases to utilize a catalytic amount of such a water-soluble metal salt in the redox system.

The free radical generators which are utilized in the redox initiator systems of this invention are well known to persons skilled in the art. Some representative examples of suitable free radical generators include the various peroxygen compounds such as potassium persulfate, ammonium persulfate, benzoyl peroxide, hydrogen peroxide, di-t-buty peroxide, dicumyl peroxide, 2,4-dichlorobenzoyl peroxide, decanoyl peroxide, lauroyl peroxide, cumene hydroperoxide, p-menthane hydroperoxide, t-butyl hydroperoxide, acetyl acetone peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohexyl sulfonyl peroxide, and the like; and the various alkyl perketals, such as 2,2-bis-(t-butylperoxy)-butane, ethyl 3,3-bis(t-butylperoxy)butyrate, 1,1-di-(t-butylperoxy) cyclohexane, and the like.

The reducing agent utilized in the redox initiator systems of this invention can be ascorbic acid, isoascorbic acid, or an ascorbic acid derivative having the structural formula:

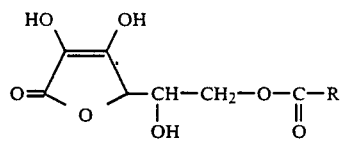

wherein R is an alkyl group containing from 1 to 30 carbon atoms. In most cases R will be an alkyl group containing from 10 to 20 carbon atoms. Ascorbic acid 6-palmitate is an example of such an ascorbic acid derivative which is highly preferred. In fact, the 6-palmitate derivative of ascorbic acid is 2 to 3 times more reactive than ascorbic acid or isoascorbic acid as a reducing agent for lauroy peroxide.

In most cases from 0.0001 to 0.005 phm of the free radical generator will be utilized in the redox systems of this invention. It will normally be preferred for the amount of free radical generator used to be within the range of 0.00025 phm to 0.001 phm with it being more preferred for 0.0005 to 0.0009 phm of the free radical generator to be used. The reducing agent is normally added incrementally at a rate of 0.00001 to 0.1 phm per hour. It is preferred for the reducing agent to be added at a rate of 0.0000g to 0.01 phm per hour with a rate of 0.0005 to 0.001 phm per hour being more preferred.

To increase the stability of the micro-suspension, it may be advantageous to add prior to and/or during the course of polymerization, an anionic emulsifier in proportion of up to 2% by weight of the monomer or monomers. This emulsifier may be the same as that or those used in the preparation of any seeding product that may be utilized. It may be selected from conventional emulsifiers such as fatty acid soaps, alkyl sulfates, alkyl sulphonates, alkyl aryl sulphonates, alkyl sulphosuccinates and alkyl phosphates.

There may be associated with this emulsifier, a non-ionic surface-active agent, such as for example the condensates of ethylene oxide or propylene oxide on various hydroxylated organic compounds.

The quantity of water to be used in the polymerization method of this invention will be such that the ratio of the sum of the weight of the monomer or monomers and the polymer of the seeding product to that of the water (including that of the seeding product) is between 0.3 and 1.5.

The size of the particles is regulated by the usual methods suitable for polymerization in emulsion, e.g. by carefully choosing the nature and quantity of emulsifier used, by using seeds and by adjusting the agitating speed.

The reaction mixture is generally heated under autogenous pressure and with moderate agitation to a temperature from 30° to 65° C. When the pressure has dropped, the reaction is stopped and any unconverted monomer is degassed.

It is highly preferred for the polymerizations of this invention to be carried out utilizing a seeding product which contains all of the free radical generator necessary for carrying out the polymerization. The seeding product is in the form of a dispersion of particles of polyvinyl chloride prepared in advance which contains all of the free radical generator needed for the polymerization. The preparation of seeding products is described in detail in U.S. Pat. No. 3,879,364 which is incorporated by reference herein in its entirety. In fact, the redox system of the present invention can be used in conjunction with the techniques disclosed in U.S. Pat. No. 3,879,364 by simply utilizing ascorbic acid, isoascorbic acid, or an ascorbic acid derivative to activate the initiator system. This can be accomplished by simply adding the ascorbic acid, isoascorbic acid or ascorbic acid derivative to the reaction zone (polymerization medium). It is also highly preferred to carry out the polymerizations of this invention in the presence of one or more other seeding products in the form of dispersions of particles of vinyl polymer, in which the sizes of the particles differ from one another and differ from that of the first seeding product. Such a technique is described in detail in U.S. Pat. No. 4,245,070 which is incorporated herein by reference in its entirety. The redox system of the present invention can be used in conjunction with the technique disclosed in U.S. Pat. No. 4,245,070 by simply activating the initiator with a reducing agent selected from the group consisting of ascorbic acid, isoascorbic acid, or an ascorbic acid derivative. However, such polymerizations cannot be conducted in the presence of a molar ratio of water-soluble metal salt to the free radical generator used of greater than 0.09. However, it is generally desirable to conduct such polymerizations in the presence of a catalytic amount of such a water-soluble metal salt of iron, copper, cobalt, nickel, tin, titanium, vanadium, manganese, chromium or silver. In the alternative, such polymerizations can be conducted in the absence of any water-soluble metal salts. However, when such polymerizations are carried out in the absence of a water-soluble metal salt, it is essential to maintain the pH of the polymerization medium within the range of 8.5 to 11.

The PVC made in accordance with the process of this invention can be recovered from the aqueous polymerization medium utilizing any one of numerous techniques known to persons skilled in the art. For instance, the PVC can be recovered from the polymerization medium by filtration, drying by coagulation, flaking, centrifugal decantation or atomization. The PVC can then be compounded with the desired combination of chemical agents. In most cases, it will be desirable to add a thermal stabilizer to the PVC in order to prevent degradation during processing. In some cases it may also be desirable to include lubricants, plasticizers, impact modifiers, processing aids, antidegradants, blowing agents, flame retardants, fungicides, antistatic agents, antiblocking agents and/or colorants in the compounding formulation depending upon the properties being sought. The PVC can then be processed by extrusion, injection molding, blow molding, calendaring or powder coating.

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLES 1 & 2

In these examples PVC was prepared in a 200 gallon (757 liter) stainless steel autoclave which was equipped with a jacketed cooling system. Example 1 was carried out utilizing the process of the present invention. Example 2 was done as a comparative experiment. In these examples, the reactor was initially charged with 150 kg of water, 1.2 g of copper sulfate (0.0005 phm), 0.6 g of nitric acid, 50 g of monopotassium phosphate, 250 g of an anionic emulsifier and 10.5 kg of an emulsion PVC latex (as a seeding product). The aqueous medium in the reactor was agitated for about 10 minutes at 30 rpm and was then double evacuated to remove any oxygen that may have been present.

The free radical generator was then introduced by adding 8.5 kg of seeding product which contained about 1.9 g of lauroyl peroxide. The aqueous medium was agitated for 10 minutes and then 250 kg of vinyl chloride was added which resulted in a pressure of 140 psi ($9.65 \times 10^5$ Pa.s) The temperature was raised to 62° C. and 0.0008 phm (parts per hundred parts of monomer) of ascorbic acid was added per hour. Additional emulsifier was also added after 2 hours, 4 hours, and 6 hours. After a polymerization time of about 7.25 hours, the pressure dropped to 60 psi ($4.1 \times 10^5$ Pa.s). The system was then degassed and the PVC produced was recovered. In Example 1, 0.0005 phm of copper sulfate and 0.000025 phm of nitric acid was added to the aqueous polymerization system. This resulted in only 1 lb. (0.43 kg) of berries being produced. Berries are solid granular matter that is recovered from latex by filtration which must be disposed of as waste material. Thus, it is highly desirable to reduce the amount of berries being produced.

Example 2 was conducted in a manner identical to the one utilized in Example 1 except that 0.003 phm of copper sulfate and 0.0015 phm of nitric acid was added to the aqueous polymerization medium. In other words, 6 times as much copper sulfate was added in Example 2 as was added in Example 1. This resulted in 7.2 lbs. (3.27 kg) of berries being produced. This experiment clearly shows the superiority of utilizing only catalytic amounts of copper sulfate in the redox initiator system. The presence of the additional metal salt and additional acid clearly destabilizes the latex being formed and consequently results in berry formation being greatly increased.

EXAMPLES 3-9

The procedure utilized in this series of experiments was essentially the same as the technique described in Examples 1 and 2, except that a slightly different anionic emusifier system was utilized. In this series of experiments, the amount of copper sulfate, nitric acid, ascorbic acid and sodium bicarbonate added was varied. The amount of each of these constituents added is shown in Table I. In Examples 3 and 4, catalytic amounts of copper sulfate were added. In Examples 5-8, no copper sulfate was added. Since no copper sulfate was added in Examples 5-8, it was not necessary to utilize nitric acid in order to maintain the solubility of the copper salt. Example 9 was conducted as a control and utilized 0.006 phm of copper sulfate and 0.003 phm of nitric acid.

TABLE I

| Example | $CuSO_4$* | $HNO_3$* | Ascorbic* Acid | Sodium* Bicarbonate | Berries** |
|---|---|---|---|---|---|
| 3 | .0005 | .00025 | .006 | .10 | 2.3 |
| 4 | .0005 | .00025 | .006 | .10 | 2.3 |
| 5 | 0 | 0 | .006 | .28 | 0.3 |
| 6 | 0 | 0 | .008 | .20 | 0.4 |
| 7 | 0 | 0 | .006 | .15 | 0.2 |

TABLE I-continued

| Example | CuSO₄* | HNO₃* | Ascorbic* Acid | Sodium* Bicarbonate | Berries** |
|---------|--------|-------|----------------|---------------------|-----------|
| 8 | 0 | 0 | .006 | .17 | 0.1 |
| 9 | .006 | .003 | .006 | .035 | 3.1 |

*phm
**pounds

As can be determined by examining Table I, the amount of berries produced was reduced dramatically by eliminating copper sulfate and nitric acid from the polymerization medium. In Examples 5-8, which did not utilize copper sulfate in the redox system, the amount of berries produced was reduced by approximately ten fold. In Examples 3 and 4 wherein a catalytic amount of copper sulfate was utilized in the redox systems, the amount of berries produced was reduced by almost 50%. This benefit was realized without experiencing any detrimental effects. This series of experiments clearly shows that the amount of berries produced can be dramatically decreased by utilizing the redox initiator system of the present invention.

EXAMPLE 10

This example is included in order to show that the benefits of the redox initiator systems of this invention can be realized in commercial scale polymerizations. A 10,000 gallon (37,850 liter) stainless steel autoclave which was equipped with a jacketed cooling system was charged with 33,730 lbs. (15,295 kg) of water, 12.8 lbs. (5.8 kg) of sodium bicarbonate, 0.2 lbs. (0.09 kg) of copper sulfate, 36.4 lbs. (6.5 kg) of an anionic emulsifier, 4,786 lbs. (2,171 kg) of an emulsion PVC latex as a seeding product, and 4,171 lbs. (1,892 kg) of a seeding product containing lauroyl peroxide. The temperature was set to 70° C. and 36,376 lbs. (16,500 kg) of vinyl chloride monomer was charged into the aqueous polymerization medium. The reaction medium was maintained at 60.5° C. with 2.6 lbs. (1.2 kg) of ascorbic acid being incrementally added throughout the polymerization. After 2 hours, 4 hours and 6 hours additional emulsifier totaling 90.9 lbs. (41.2 kg) was added.

Three runs were made utilizing the redox initiator system of the subject invention. These runs had an average polymerization time (until a pressure drop was experienced) of about 8 hours. The amount of berries produced was reduced to 2.22 drums per batch. This compares favorably to runs which are made utilizing conventional initiator systems which utilize much larger amounts of a water-soluble metal salt and acid. For instance, a series of runs utilizing the same technique but which employed 0.5 kg of zinc sulfate and 0.50 kg of nitric acid in the initiator system resulted in the production of an average of 2.64 drums of berries per batch.

In commercial scale quantities an additional benefit is realized by utilizing the redox initiator system of this invention. More specifically, the amount of time that it takes to degas the aqueous medium after the polymerization has been completed is greatly reduced. By reducing the time required for degassing the throughput of a reactor can be greatly increased. In the case at hand, the utilization of the redox initiator system of this invention resulted in an average degas time of about 1.9 hours. This compares very favorably with an average degas time of about 2.8 hours which is experienced utilizing conventional initiator systems which utilize 0.5 kg of zinc sulfate and 0.5 kg of nitric acid.

By practicing the process of the present invention, several advantages can be realized in the commercial synthesis of PVC. More specifically, the utilization of the redox initiator systems of the present invention results in the formation of more stable latices, the production of fewer berries, and the formation of less coagulum. Additionally, the utilization of the process of the present invention results in shorter degas times and consequently greater reactor throughputs. The problem of discoloration which is sometimes caused by the water-soluble metal salt can also be eliminated.

While certain representative embodiments and details have been shown for the purpose of illustrating the present invention, it will be apparent to those skilled in this art that various changes and modifications can be made without departing from the scope of the present invention.

What is claimed is:

1. In a process for the micro-suspension polymerization of vinyl chloride monomer into polyvinyl chloride in the presence of water and an emulsifier; the improvement which comprises utilizing as the initiator a redox system which is comprised of (a) a free radical generator, (b) a reducing agent selected from the group consisting of ascorbic acid, isoascorbic acid, and ascorbic acid derivatives having the structural formula:

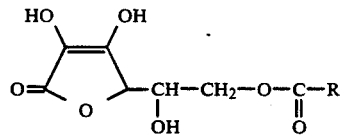

wherein R is an alkyl group containing from 1 to 30 carbon atoms, and (c) a water-soluble metal salt of iron, copper, cobalt, nickel, tin, titanium, vanadium, manganese, chromium or silver; wherein the molar ratio of said water-soluble metal salt to said free radical generator is within the range of 0.0001 to 0.01.

2. A process as specified in claim 1 wherein said reducing agent is selected from the group consisting of ascorbic acid, isoascorbic acid and ascorbic acid 6-palmitate.

3. A process as specified in claim 2 wherein the molar ratio of said water-soluble metal salt to said free radical generator is within the range of 0.001 to 0.008.

4. A process as specified in claim 3 wherein from 0.0001 phm to 0.005 phm of said free radical generator is present.

5. A process as specified in claim 4 wherein said free radical generator is a peroxygen compound.

6. A process as specified in claim 5 wherein the reducing agent is incrementally added at a rate of 0.00001 to 0.1 phm per hour.

7. A process as specified in claim 6 wherein said reducing agent is ascorbic acid 6-palmitate.

8. A process as specified in claim 6 wherein said reducing agent is selected from the group consisting of ascorbic acid and isoascorbic acid.

9. A process as specified in claim 8 wherein from 0.00025 to 0.001 phm of said free radical generator is present and wherein the reducing agent is added at a rate of 0.00005 to 0.01 phm per hour.

10. A process as specified in claim 9 wherein said free radical generator is selected from the group consisting of potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauroyl peroxide, cumene hydroperoxide, p-menthane hydroperoxide, t-butyl hydroperoxide, acetyl acetone peroxide, methyl ethyl ketone peroxide, succinic acid peroxide, dicetyl peroxydicarbonate, t-butyl peroxyacetate, t-butyl peroxymaleic acid, t-butyl peroxybenzoate, and acetyl cyclohexyl sulfonyl peroxide.

11. A process as specified in claim 10 wherein from 0.0005 to 0.0009 phm of said free radical generator is present and wherein the reducing agent is added at a rate of 0.0005 to 0.001 phm per hour.

12. A process as specified in claim 11 wherein the free radical generator is lauroyl peroxide, wherein said reducing agent is ascorbic acid, and wherein said water-soluble metal salt is copper sulfate.

13. A process as specified in claim 1 wherein the water-soluble metal salt is a copper salt.

14. A process as specified in claim 1 wherein the water-soluble metal salt is copper sulfate.

* * * * *